United States Patent [19]
Fischer

[11] 3,912,494
[45] Oct. 14, 1975

[54] HERBICIDE
[75] Inventor: Adolf Fischer, Mutterstadt, Germany
[73] Assignee: BASF Aktiengesellschaft, Ludwigshafen/Rhine, Germany
[22] Filed: May 24, 1974
[21] Appl. No.: 473,222

[30] Foreign Application Priority Data
June 3, 1973   Germany............................ 2329044

[52] U.S. Cl............................................. 71/87; 71/91
[51] Int. Cl.²........................................... A01N 9/36
[58] Field of Search.................................. 71/91, 86

[56] References Cited
UNITED STATES PATENTS

| | | | |
|---|---|---|---|
| 3,708,277 | 1/1973 | Zeidler et al. | 71/91 |
| 3,826,692 | 7/1974 | Fischer | 71/91 |

Primary Examiner—James O. Thomas, Jr.
Attorney, Agent, or Firm—Johnston, Keil, Thompson & Shurtleff

[57] ABSTRACT

New and valuable herbicide containing a mixture of different active ingredients.

2 Claims, No Drawings

HERBICIDE

This application discloses and claims subject matter described in German Pat. application 23 29 044, filed June 6, 1973, which is incorporated herein by reference.

The present invention relates to new and valuable herbicides containing mixtures of active ingredients.

It is known that benzothiadiazinone dioxides (German Laid-Open application No. 1,542,836) and phosphoric esters have a herbicidal action. However, this action is not always satisfactory.

We have now found that a composition of a. a compound of the formula

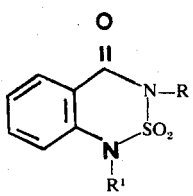

where R denotes lower alkyl of a maximum of 4 carbon atoms and $R^1$ denotes hydrogen, or a salt thereof, e.g., a salt of ammonium, sodium, potassium, lithium, calcium, magnesium, ethylamine, dimethylamine, ethanolamine, diethanolamine, and dimethylethanolamine, and b. a compound of the formula

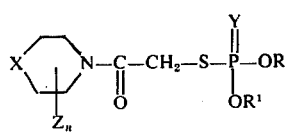

where R and $R^1$ each denote lower alkyl, alkenyl, or alkynyl, Z denotes methyl, $n$ denotes one of the integers 0, 1, 2 and 3, Y denotes oxygen or sulfur, and X denotes $—CH_2$, O or N, has a better herbicidal action than its individual components.

The compositions may contain one or more components of formula $a$ and of formula $b$.

The ratio of the active ingredients of formula $a$ to those of formula $b$ may be varied at will; it is, however, preferred to use a ratio of $a : b$ of from 10 : 1 to 1 : 3 parts by weight.

The amount used of the agents of the invention may vary and depends on the effect desired; it generally is from 0.1 to 30 and more, and preferably 0.2 to 6, kg per hectare. The agents according to the inventionn may be applied once or several times before or after planting, before sowing, pre- or postemergence, or during emergence of the crop plants or weeds.

The composition are suitable for controlling unwanted plants in, for instance, the following crops:

| | |
|---|---|
| Oryza sativa | Glycine max. |
| Zea mays | Solanum tuberosum |
| Triticum spp. | Gossypium hirsutum |
| Hordeum spp. | Beta vulgaris, Sorghum bicolor |
| Secale cereale | Saccharum officinarum. |

The compositions may also be used as total agents in ditches, on aquatic areas, railway tracks, barren and waste land, etc.

The agents have a strong herbicidal action and may therefore be used as weedkillers or for controlling the growth of unwanted plants. Whether the new active ingredients are used as total or selective agents depends in essence on the amount of ingredient used per unit area.

By weeds and unwanted plant growth are meant all monocotyledonous and dicotyledonous plants which grow in loci where they are not desired.

The agents according to the invention may therefore be used for controlling for instance

| | |
|---|---|
| *Gramineae*, such as | |
| *Cynodon* spp. | *Dactylis* spp. |
| *Digitaria* spp. | *Avena* spp. |
| *Echinochloa* spp. | *Bromus* spp. |
| *Setaria* spp. | *Uniola* spp. |
| *Panicum* spp. | *Poa* spp. |
| *Alopecurus* spp. | *Leptochloa* spp. |
| *Lolium* spp. | *Brachiaria* spp. |
| *Sorghum* spp. | *Eleusine* spp. |
| *Agropyron* spp. | *Cenchrus* spp. |
| *Phalaris* spp. | *Eragrostis* spp. |
| *Apera* spp. | etc.; |
| *Cyperaceae*, such as | |
| *Carex* spp. | *Eleocharis* spp. |
| *Cyperus* spp. | etc.; |
| *Scirpus* spp. | |
| dicotyledonous weeds, such as | |
| *Malvaceae*, e.g. | |
| *Abutilon theoprasti* | *Hibiscus* spp. |
| *Sida* spp. | *Malva* spp. |
| etc.; | |
| *Compositae*, such as | |
| *Ambrosia* spp. | *Centaurea* spp. |
| *Lactuca* spp. | *Tussilago* spp. |
| *Senecio* spp. | *Lapsana communis* |
| *Sonchus* spp. | *Tagetes* spp. |
| *Xanthium* spp. | *Erigeron* spp. |
| *Iva* spp. | *Anthemis* spp. |
| *Galinsoga* spp. | *Matricaria* spp. |
| *Taraxacum* spp. | *Artemisia* spp. |
| *Chrysanthemum* spp. | *Bidens* spp. |
| *Cirisum* spp. | etc.; |
| *Convolvulaceae*, such as | |
| *Convolvulus* spp. | *Cuscuta* spp. |
| *Ipomoea* spp. | *Jaquemontia tamnifolia* |
| etc.; | |
| *Cruciferae*, such as | |
| *Barbarea vulgaris* | *Arabidopsis thaliana* |
| *Brassica* spp. | *Descurainia* spp. |
| *Capsella* spp. | *Draba* spp. |
| *Sisymbrium* spp. | *Coronopus didymus* |
| *Thlaspi* spp. | *Lepidium* spp. |
| *Sinapis arvensis* | *Raphanus* spp. |
| etc.; | |
| *Geraniaceae*, such as | |
| *Erodium* spp. | *Geranium* spp. |
| etc.; | |
| *Portulacaceae*, such as | |
| *Portulaca* spp. | etc.; |
| *Primulaceae*, such as | |
| *Anagallis arvensis* | *Lysimachia* spp. |
| etc.; | |
| *Rubiaceae*, such as | |
| *Richardia* spp. | *Diodia* spp. |
| *Galium* spp. | etc.; |
| *Scrophulariaceae*, such as | |
| *Linaria* spp. | *Digitalis* spp. |
| *Veronica* spp. | etc.; |
| *Solanaceae*, such as | |
| *Physalis* spp. | *Nicandra* spp. |
| *Solanum* spp. | *Datura* spp. |
| etc.; | |
| *Urticaceae*, such as | |
| *Urtica* spp. | etc.; |
| *Violaceae*, such as | |
| *Viola* spp. | etc.; |
| *Zygophyllaceae*, such as | |
| *Tribulus terrestris* | etc.; |
| *Euphorbiaceae*, such as | |
| *Mercurialis annua* | *Euphorbia* spp. |
| *Umbelliferae*, such as | |
| *Daucus carota* | *Ammi majus* |
| *Aethusa cynapium* | etc.; |
| *Commelinaeae*, such as | |
| *Commelina* spp. | etc.; |
| *Labiatae*, such as | |
| *Lamium* spp. | *Galeopsis* spp. |

-Continued etc.;
Leguminosae, such as
Medicago spp.           Sesbania exaltata
Trifolium spp.          Cassia spp.
Vicia spp.              Lathyrus spp.
etc.;
Plantaginaceae, such as
Plantago spp.           etc.;
Polygonaceae, such as
Polygonum spp.          Fagopyrum spp.
Rumex spp.              etc.;
Aizoaceae, such as
Mollugo verticillata    etc.;
Amaranthaceae, such as
Amaranthus spp.         etc.;
Boraginaceae, such as
Amsinckia spp.          Anchusa spp.
Myostis spp.            Lithospermum spp.
etc.;
Caryophyllaceae, such as
Stellaria spp.          Silene spp.
Spergula spp.           Cerastium spp.
Saponaria spp.          Agrostemma githago
Scleranthus annuus      etc.;
Chenopodiaceae, such as
Chenopodium spp.        Atriplex spp.
Kochia spp.             Monolepsis nuttaliana
Salsola kali            etc.;
Lythraceae, such as
Cuphea spp.             etc.;
Oxalidaceae, such as
Oxalis spp.             etc.;
Ranunculaceae, such as
Ranunculus spp.         Adonis spp.
Delphinium spp.         etc.;
Papaveraceae, such as
Papaver spp.            Fumaria officinalis
etc.;
Onagraceae, such as
Jussiaea spp.           etc.;
Rosaceae, such as
Alchemillia spp.        Potentilla spp.
etc.;
Potamogetonaceae, such as
Potamogeton spp.        etc.;
Najadaceae, such as
Najas spp.              etc.;
Marsileaceae, such as
Marsilea quadrifolia    etc.;
Polypodiaceae, such as
Pteridium aguilinum,
Alismataceae,such as
Alisma spp.             Sagittaria sagittifolia
etc.;
Equisetaceae, such as
Equisetaceae spp.       etc.

Application may be effected for instance in the form of directly sprayable solutions, powders, suspensions, dispersions, emulsions, oil dispersions, pastes, dusts, or granules by spraying, atomizing, dusting, broadcasting or watering. The forms of application depend entirely on the purpose for which the agents are being used; in any case they should ensure a fine distribution of the active ingredient.

For the preparation of solutions, emulsions, pastes and oil dispersions to be sprayed direct, mineral oil fractions of medium to high boiling point, such a kerosene or diesel oil, further coal-tar oils and oils of vegetable or mineral origin, aliphatic, cyclic and aromatic hydrocarbons such as benzene, toluene, xylene, paraffin, tetrahydronaphthalene, alkylated napthalenes, methanol, ethanol, propanol, butanol, chloroform, carbon tetrachloride, cyclohexanol, cyclohexanone, chlorobenzene, isophorone, etc., and strongly polar solvents such as dimethylformamide and dimethyl sulfoxide are suitable.

Aqueous formulations may be prepared from emulsion concentrates, pastes, oil dispersions or wettable powders by adding water. To prepare emulsions, pastes and oil dispersions the ingredients as such or dissolved in an oil or solvent may be homogenized in water by means of wetting or dispersing agents, adherents or emulsifiers. Concentrates which are suitable for dilution with water may be prepared from active ingredient, wetting agent, adherent, emulsifying or dispersing agent and possibly solvent or oil.

Examples of surfactants are: alkali metal, alkaline earth metal and ammonium salts of ligninsulfonic acid, naphthalenesulfonic acid, phenolsulfonic acids, alkylaryl sulfonates, alkyl sulfates, and alkyl sulfonates, alkali metal and alkaline earth metal salts of dibutylnaphthalenesulfonic acid, lauryl ether sulfate, fatty alcohol sulfates, alkali metal and alkaline earth metal salts of fatty acids, salts of sulfated hexadecanols, heptadecanols, and octadecanols, salts of sulfated fatty alcohol glycol ether, condensation products of sulfonated naphthalene and naphthalene derivatives with formaldehyde, condensation products of naphthalene or naphthalenesulfonic acids with phenol and formaldehyde, polyoxyethylene octylphenol ethers, ethoxylated isooctylphenol, ethoxylated octylphenol and ethoxylated nonylphenol, alkylphenol polyglycol ethers, tributylphenyl polyglycol ethers, alkylaryl polyether alcohols, isotridecyl alcohol, fatty alcohol ethylene oxide condensates, ethoxylated caster oil, polyoxyethylene alkyl ethers, ethoxylated polyoxypropylene, lauryl alcohol polyglycol ether acetal, sorbitol esters, lignin, sulfite waste liquors and methyl cellulose.

Powders, broadcasting agents and dusts may be prepared by mixing or grinding the active ingredients with a solid carrier.

Granules, e.g., coated, impregnated or homogeneous granules, may be prepared by bonding the active ingredients to solid carriers. Examples of solid carriers are mineral earths such as silica gel, silica acid, silicates, talc, kaolin, Attaclay, limestone, lime, chalk, bole, loess, clay, dolomite, diatomaceous earth, calcium sulfate, magnesium sulfate, magnesium oxide, ground plastics, fertilizers such as ammonium sulfate, ammonium phosphate, ammonium nitrate, and ureas, and vegetable products such as grain flours, bark meal, wood meal, and nutshell meal, cellulosic powders, etc.

There may be added (if desired, immediately before use) to the compositions or individual active ingredients (used singly, either before, simultaneously with and/or after the active ingredients of the invention) oils of various types, herbicides, fungicides, nematocides, insecticides, bactericides, trace elements, fertilizers, antifoams (e.g., silicones), growth regulators, antidotes and other herbicidally effective compounds such as substituted anilines, substituted aryloxycarboxylic acids and salts, esters and amides thereof, substituted ethers, substituted arsonic acids and their salts, esters and amides, substituted benzimidazoles, substituted benzisothiazoles, substituted benzothiadiazinone dioxides, substituted benzoxazines, substituted benzoxazinones, substituted benzothiadiazoles, substituted biurets, substituted quinolines, substituted carbamates, substituted aliphatic carboxylic acids and their salts, esters and amides, substituted aromatic carboxylic acids and their salts, esters and amides, substituted carbamoylalkylthiol- or -dithiophosphates, substituted quinazolines, substituted cycloalkylamidocarbothiolic acids and their salts, esters and amides, substituted cycloalkylcarbonamidothiazoles, substituted dicarboxylic acids and their salts, esters and amides substituted dihydrobenzofuranyl sulfonates, substituted disulfides, substituted dipyridylium salts, substituted dithiocarbamates, substituted dithiophosphoric acids and their salts, esters and amides, substituted ureas, substituted hexahydro-1H-carbothioates, substituted hydantoins, substituted hydrazides, substituted hydrazonium salts, substituted isooxazole pyrimidones, substituted imidazoles, substituted isothiazole pyrimidones, substituted ketones, substituted naphthoquinones, substituted aliphatic nitriles, substituted aromatic nitriles, substituted oxadiazoles, substituted oxadiazinones, substituted oxadiazolidine diones, substituted oxadiazine diones, substituted phenols and their salts and esters, substituted phosphonic acids and their salts, esters and amides, substituted phosphonium chlorides, substituted phosphonalkylglycines, substituted phosphites, substituted phosphoric acids and their salts, esters and amides, substituted piperidines, substituted pyrazoles, substituted pyrazole alkylcarboxylic acids and their salts, esters and amides, substituted pyrazolium salts, substituted pyrazolium alkyl sulfates, substituted pyridazines, substituted pyridazones, substituted pyridine carboxylic acids and their salts, esters and amides, substituted pyridines, substituted pyridine carboxylates, substituted pyridinones, substituted pyrimidines, substituted pyrimidones, substituted pyrrolidine carboxylic acid and its salts, esters and amides, substituted pyrrolidines, substituted pyrrolidones, substituted arylsulfonic acids and their salts, esters and amides, substituted styrenes, substituted tetrahydrooxadiazine diones, substituted tetrahydrooxadiazole diones, substituted tetrahydromethanoindenes, substituted tetrahydrooxadiazole thiones, substituted tetrahydrodiazine thiones, substituted tetrahydrothiadiazole diones, substituted aromatic thiocarbonylamides, substituted thiocarboxylic acids and their salts, esters and amides, substituted thiol carbamates, substituted thioureas, substituted thiophosphoric acids and their salts, esters and amides, substituted triazines, substituted uracils, substituted uretidine diones.

These agents may be added to the herbicides according to the invention in a ratio by weight of from 1 : 10 to 10 : 1. The same applies to oils, fungicides, nematocides, insecticides, bactericides, antidotes and growth regulators.

Compositions of the following compounds were tested in the greenhouse and in the open on the plants mentioned above:

3-isopropyl-2,1,3-benzothiadiazinone-(4)-2,2-dioxide,
3-isopropyl-2,1,3-benzothiadiazinone-(4)-42,2-dioxide, sodium salt,
3-isopropyl-2,1,3-benzothiadiazinone-(4)-2,2-dioxide, dimethylamine salt,
3-isopropyl-2,1,3-benzothiadiazinone-(4)-2,2-dioxide, diethanolamine salt,
3-isopropyl-2,1,3-benzothiadiazinone-(4)-2,2-dioxide, potassium salt,
3-isopropyl-2,1,3-benzothiadiazinone-(4)-2,2-dioxide, ammonium salt,
3-isopropyl-2,1,3-benzothiadiazinone-(4)-2,2-dioxide, lithium salt,
3-isopropyl-2,1,3-benzothiadiazinone-(4)-2,2-dioxide, magnesium salt,
3-isopropyl-2,1,3-benzothiadiazinone-(4)-2,2-dioxide, ethylamine salt,
3-isopropyl-2,1,3-benzothiadiazinone-(4)-2,2-dioxide, ethanolamine salt,
3-isopropyl-2,1,3-benzothiadiazinone-(4)-2,2-dioxide, triethanolamine salt and other salts,
3-methyl-2,1,4-benzothiadiazinone-(4) -2,2-dioxide,
3-ethyl-2,1,3-benzothiadiazinone-(4)-2,2-dioxide,
3-n-propyl-2,1,3-benzothiadiazinone-(4)-2,2-dioxide,
3-sec-butyl-2,1,3-benzothiadiazinone-(4)-2,2-dioxide,
S-(2-methyl-1-piperidylcarbonylmethyl)-0,0-di-n-propyldithiophosphate,
S-(2,5-dimethyl-1-morpholinylcarbonylmethyl)-0,0-diethyldithiophosphate,
S-(3,5-dimethyl-1-morpholinylcarbonylmethyl)-0-0-diethyldithiophosphate and others.

EXAMPLE 1

In the greenhouse, loamy sandy soil was filled into pots. The soil prepared in this manner was then treated with the following amounts of the following individual active ingredients and compositions thereof as solutions in an organic solvent:

I     3-isopropyl-2,1,3-benzothiadiazinone-(4)-2,2-dioxide, 0.25, 0.5, 0.75, 1, 1.25, 1.5 and 2 kg per hectare;

II    S—(2-methyl-1-piperidylcarbonylmethyl)-0,0-di-n-propyldithiophosphate dithiophosphate; 0.25, 0.5, 0.75, 1, 1.25, 1.5 and 2 kg per hectare;

I + II 0.25+1.25, 1.25+0.25, 0.75+0.75, 1.5+0.5, 0.5+1.5, 1+1 kg per hactare.

Seeds of the unwanted plants were then sown, and plants of Oryza sativa (plant height 10 to 40 cm) were planted, in the soil prepared in this manner. The surface of the soil was then covered with water to a depth of 10 cm.

After 3 to 4 weeks it was ascertained that the composition of I + II had a better herbicidal action than its individual components, combined with the same good crop plant compatibility.

The results of this experiment are given below:

| Active ingredient kg/ha | I | | | | | | |
|---|---|---|---|---|---|---|---|
| | 0.25 | 0.5 | 0.75 | 1.0 | 1.25 | 1.5 | 2.0 |
| Crop plant: | | | | | | | |
| Oryza sativa | 0 | 0 | 0 | 0 | 0 | 0 | 0 |
| Unwanted plants: | | | | | | | |
| Alisma plantago-aquatica | 5 | 10 | 16 | 20 | 25 | 30 | 50 |
| Cyperus esculentus | 0 | 5 | 8 | 10 | 15 | 18 | 25 |
| Echinochloa crus-galli | 0 | 0 | 0 | 0 | 0 | 5 | 7 |
| Active ingredient | II | | | | | | |
| kg/ha | 0.25 | 0.5 | 0.75 | 1.0 | 1.25 | 1.5 | 2.0 |
| Oryza sativa | 0 | 0 | 0 | 0 | 0 | 0 | 10 |
| Alisma plantago-aquatica | 0 | 5 | 10 | 14 | 20 | 25 | 32 |
| Cyperus esculentus | 0 | 5 | 10 | 16 | 20 | 25 | 28 |
| Echinochloa crus-galli | 25 | 40 | 53 | 60 | 76 | 80 | 95 |
| Active Ingredient kg/ha | I + II | | | | | |
| | 0.25+1.25 | 1.25+0.25 | 0.75+0.75 | 1.5+0.5 | 0.5+1.5 | 1+1 |
| Oryza sativa | 0 | 0 | 0 | 0 | 0 | 0 |
| Alisma plantago-aquatica | 56 | 55 | 60 | 73 | 72 | 70 |
| Cyperus esculentus | 48 | 46 | 50 | 56 | 64 | 58 |
| Echinochloa crus-galli | 100 | 56 | 90 | 80 | 100 | 96 |

0 = no damage
100 = complete destruction.

EXAMPLE 2

In the greenhouse, loamy sandy soil was filled into pots and sown with various seeds. The soil prepared in this manner was then treated with the following amounts of the following individual active ingredients and compositions thereof as granules:

I     3-isopropyl-2,1,3-benzothiadiazinone-(4)-2,2-dioxide, 1, 2, 3 and 4 kg per hectare;

II     S-(2-methyl-1-piperidylcarbonylmethyl)-0,0-di-n-propyldithiophosphate, 1, 2, 3 and 4 kg per hectare, I + II 3+1, 1+3 and 2+2 kg per hectare; for comparison, III     0,0-diethyl-S-(N-phenyl-N-propargyl)-carbomoylmethyldithiophosphate, 3 and 4 kg per hectare;

III + I 3+1 kg per hectare.

After 3 to 4 weeks it was ascertained that the composition of I + II had better crop plant compatibility than compounds I, II, III and the composition III + I, combined with the same good herbicidal action.

The results are given below:

I     3-isopropyl-2,1,3-benzothiadiazinone-(4)-2,2-dioxide, 0.25, 0.75, 1.25 and 1.5 kg per hectare;

II     3-isopropyl-2,1,3-benzothiadiazinone-(4)-2,2-dioxide, sodium salt; 0.25, 0.75, 1.25 and 1.5 kg per hectare;

III     3-isopropyl-2,1,3-benzothiadiazinone-(4)-2,2-dioxide, dimethylamine salt; 0.25, .75, 1.25 and 1.5 kg per hectare;

IV     3-isopropyl-2, 1, 3-benzothiadiazinone-(4)-2,2-dioxide, diethanolamine salt; 0.25, 0.75, 1.25 and 1.5 kg per hectare;

V     S-(2-methyl-1-piperidylcarbonylmethyl)-0,0-di-n-propyldithiophosphate; 0.25, 0.75, 1.25 and 1.5 kg per hectare;

I+V 0.25+1.25, 0.75+0.75 and 1.25+0.25 kg per hectare;

II+V 0.25+1.25, 0.75+0.75 and 1.25+0.25 kg per hectare;

III+V 0.25+1.25, 0.75+0.75 and 1.25+0.25 kg per hectare;

IV+V 0.25+1.25, 0.75+0.75 and 1.25+0.25 kg per hectare.

| Active ingredient | I | | | | II | | | |
|---|---|---|---|---|---|---|---|---|
| kg/ha | 1 | 2 | 3 | 4 | 1 | 2 | 3 | 4 |
| Crop plants: | | | | | | | | |
| Oryza sativa | 0 | 0 | 0 | 0 | 0 | 5 | 10 | 15 |
| Gossypium hirsutum | 0 | 0 | 0 | 0 | 0 | 0 | 0 | 5 |
| Beta vulgaris | 0 | 0 | 0 | 0 | 0 | 0 | 5 | 10 |
| Glycine max. | 0 | 0 | 0 | 0 | 0 | 0 | 0 | 5 |
| Unwanted plants: | | | | | | | | |
| Alisma plantago-aquatica | 20 | 50 | 64 | 80 | 14 | 32 | 40 | 44 |
| Cyperus esculentus | 10 | 25 | 30 | 57 | 16 | 28 | 35 | 40 |
| Echinochloa crus-galli | 0 | 7 | 10 | 15 | 60 | 95 | 100 | 100 |

| Active ingredient | III | | I+II | | | III+I |
|---|---|---|---|---|---|---|
| kg/ha | 3 | 4 | 3+1 | 1+3 | 2+2 | 3+1 |
| Oryza sativa | 30 | 45 | 0 | 10 | 5 | 30 |
| Gossypium hirsutum | 15 | 20 | 0 | 0 | 0 | 15 |
| Beta vulgaris | 20 | 27 | 0 | 5 | 0 | 20 |
| Glycine max. | 18 | 25 | 0 | 0 | 0 | 18 |
| Alisma plantago-aquatica | 35 | 42 | 100 | 96 | 100 | 98 |
| Cyperus esculentus | 32 | 43 | 86 | 85 | 90 | 79 |
| Echinochloa crus-galli | 90 | 100 | 100 | 100 | 100 | 100 |

0 = no damage
100 = complete destruction

EXAMPLE 3

In the greenhouse, various plants were treated at a growth height of from 2 to 18 cm with the following amounts of the following individual active ingredients and compositions thereof as emulsions or pastes:

After 10 to 14 days it was ascertained that the compositions has a better herbicidal action than their individual components, combined with the same good crop plant compatibility.

The results are given below:

| Active ingredient | I | | | | II | | | |
|---|---|---|---|---|---|---|---|---|
| kg/ha | 0.25 | 0.75 | 1.25 | 1.5 | 0.25 | 0.75 | 1.25 | 1.5 |
| Crop plants: | | | | | | | | |
| Oryza sativa | 0 | 0 | 0 | 0 | 0 | 0 | 0 | 0 |
| Zea mays | 0 | 0 | 0 | 0 | 0 | 0 | 0 | 0 |
| Solanum tuberosum | 0 | 0 | 0 | 0 | 0 | 0 | 0 | 0 |
| Triticum aestivum | 0 | 0 | 0 | 0 | 0 | 0 | 0 | 0 |
| Unwanted plants: | | | | | | | | |
| Alisma plantago-aquatica | 35 | 50 | 60 | 70 | 20 | 34 | 60 | 72 |
| Cyperus esculentus | 20 | 65 | 70 | 85 | 10 | 30 | 58 | 70 |
| Cyperus rotundus | 25 | 60 | 75 | 85 | 15 | 40 | 70 | 76 |
| Echinochloa crus-galli | 0 | 8 | 15 | 15 | 0 | 10 | 17 | 20 |

| Active ingredient | III | | | | IV | | | |
|---|---|---|---|---|---|---|---|---|
| kg/ha | 0.25 | 0.75 | 1.25 | 1.5 | 0.25 | 0.75 | 1.25 | 1.5 |
| Oryza sativa | 0 | 0 | 0 | 0 | 0 | 0 | 0 | 0 |
| Zea mays | 0 | 0 | 0 | 0 | 0 | 0 | 0 | 0 |
| Solanum tuberosum | 0 | 0 | 0 | 0 | 0 | 0 | 0 | 0 |
| Triticum aestivum | 0 | 0 | 0 | 0 | 0 | 0 | 0 | 0 |
| Alisma plantago-aquatica | 20 | 37 | 64 | 80 | 21 | 40 | 69 | 83 |
| Cyperus esculentus | 15 | 35 | 62 | 70 | 10 | 30 | 67 | 78 |
| Cyperus rotundus | 10 | 25 | 60 | 70 | 8 | 25 | 64 | 75 |
| Echinochloa crus-galli | 0 | 9 | 12 | 13 | 5 | 10 | 17 | 20 |

| Active ingredient | V | | | |
|---|---|---|---|---|
| kg/ha | 0.25 | 0.75 | 1.25 | 1.5 |
| Oryza sativa | 0 | 0 | 0 | 5 |
| Zea mays | 0 | 0 | 0 | 7 |
| Solanum tuberosum | 0 | 0 | 0 | 10 |
| Triticum aestivum | 0 | 0 | 0 | 5 |
| Alisma plantago-aquatica | 10 | 20 | 32 | 40 |
| Cyperus esculentus | 5 | 10 | 20 | 26 |
| Cyperus rotundus | 0 | 0 | 14 | 19 |
| Echinocloa crus-galli | 20 | 56 | 80 | 85 |

| Active ingredient | I+V | | | II+V | | |
|---|---|---|---|---|---|---|
| kg/ha | 0.25+1.25 | 0.75+0.75 | 1.25+0.25 | 0.25+1.25 | 0.75+0.75 | 1.25+0.25 |
| Oryza sativa | 0 | 0 | 0 | 0 | 0 | 0 |
| Zea mays | 0 | 0 | 0 | 0 | 0 | 0 |
| Solanum tuberosum | 0 | 0 | 0 | 0 | 0 | 0 |
| Triticum aestivum | 0 | 0 | 0 | 0 | 0 | 0 |
| Alisma plantago-aquatica | 95 | 100 | 98 | 90 | 88 | 98 |
| Cyperus esculentus | 72 | 100 | 100 | 65 | 76 | 95 |
| Cyperus rotundus | 75 | 95 | 100 | 70 | 73 | 98 |
| Echinocloa crus-galli | 100 | 100 | 74 | 100 | 97 | 75 |

| Active ingredient | III+V | | | IV+V | | |
|---|---|---|---|---|---|---|
| kg/ha | 0.25+1.25 | 0.75+0.75 | 1.25+0.25 | 0.25+1.25 | 0.75+0.75 | 1.25+0.25 |
| Oryza sativa | 0 | 0 | 0 | 0 | 0 | 0 |
| Zea mays | 0 | 0 | 0 | 0 | 0 | 0 |
| Solanum tuberosum | 0 | 0 | 0 | 0 | 0 | 0 |
| Triticum aestivum | 0 | 0 | 0 | 0 | 0 | 0 |
| Alisma plantago-aquatica | 85 | 89 | 100 | 90 | 92 | 100 |
| Cyperus esculentus | 70 | 80 | 98 | 68 | 75 | 100 |
| Cyperus rotundus | 60 | 58 | 95 | 55 | 56 | 96 |
| Echinochloa crus-galli | 100 | 95 | 75 | 100 | 94 | 70 |

0 = no damage
100 = complete destruction

EXAMPLE 4

In the open, various plants were treated at a growth height of from 3 to 25 cm with the following amounts of the following individual active ingredients and compositions thereof as dispersions or dusts:

IV 3-isopropyl-2,1,3-benzothiadiazinone-(4)-2,2-dioxide, diethanolamine salt; 1, 1.5, 2 and 3 kg per hectare;

V S-(2-methyl-1-piperidylcarbonylmethyl)-O,O-di-n-propyldithiophosphate; 1, 1.5, 2 and 3 kg per hectare;

I+V 2+1, 1+2 and 1.5+1.5 kg per hectare;
II+V 2+1, 1+2 and 1.5+1.5 kg per hectare;
III+V 2+1, 1+2 and 1.5+1.5 kg per hectare;
2+1, 1+2 and 1.5+1.5 kg per hectare.

After 12 to 16 days it was ascertained that the compositions had a better herbicidal action than their individual components, combined with the same good crop plant compatibility.

The results are given below:

| Active ingredient | I | | | | II | | | |
|---|---|---|---|---|---|---|---|---|
| kg/ha | 1.0 | 1.5 | 2.0 | 3.0 | 1.0 | 1.5 | 2.0 | 3.0 |
| Crop plant: | | | | | | | | |
| Oryza sativa | 0 | 0 | 0 | 0 | 0 | 0 | 0 | 0 |
| Unwanted plants: | | | | | | | | |
| Alisma plantago-aquatica | 55 | 70 | 80 | 95 | 50 | 72 | 83 | 97 |
| Cyperus esculentus | 65 | 85 | 95 | 100 | 50 | 70 | 80 | 95 |
| Cyperus rotundus | 70 | 85 | 95 | 100 | 60 | 76 | 90 | 100 |
| Echinochloa crus-galli | 10 | 15 | 20 | 25 | 15 | 20 | 24 | 30 |

| Active ingredient | III | | | | IV | | | |
|---|---|---|---|---|---|---|---|---|
| kg/ha | 1.0 | 1.5 | 2.0 | 3.0 | 1.0 | 1.5 | 2.0 | 3.0 |
| Oryza sativa | 0 | 0 | 0 | 0 | 0 | 0 | 0 | 0 |
| Alisma plantago-aquatica | 52 | 80 | 92 | 100 | 58 | 83 | 95 | 100 |
| Cyperus esculentus | 50 | 70 | 80 | 90 | 53 | 78 | 90 | 100 |
| Cyperus rotundus | 48 | 70 | 90 | 100 | 50 | 75 | 90 | 98 |
| Echinochloa crus-galli | 10 | 13 | 15 | 25 | 14 | 20 | 24 | 30 |

I 3-isopropyl-2,1,3-benzothiadiazinone-(4)-2,2-dioxide, 1, 1.5, 2 and 3 kg per hectare;
II 3-isopropyl-2,1,3-benzothiadiazinone-(4)-2,2-dioxide, sodium salt; 1, 1.5, 2 and 3 kg per hectare;
III 3-isopropyl-2,1,3-benzothiadiazinone-(4)-2,2-dioxide, dimethylamine salt; 1, 1.5, 2 and 3 kg per hectare;

| Active ingredient | V | | | |
|---|---|---|---|---|
| kg/ha | 1.0 | 1.5 | 2.0 | 3.0 |
| Oryza sativa | 0 | 5 | 10 | 15 |
| Alisma plantago-aquatica | 25 | 40 | 53 | 70 |
| Cyperus esculentus | 15 | 26 | 30 | 40 |
| Cyperus rotundus | 0 | 19 | 25 | 30 |
| Echinochloa crus-galli | 75 | 85 | 95 | 100 |

| Active ingredient | I+V | | | II+V | | |
|---|---|---|---|---|---|---|
| kg/ha | 2+ | 1+2 | 1.5+1.5 | 2+1 | 1+2 | 1.5+1.5 |
| Oryza sativa | 0 | 10 | 5 | 0 | 10 | 5 |
| Alisma plantago-aquatica | 100 | 100 | 100 | 100 | 100 | 100 |
| Cyperus esculentus | 100 | 100 | 100 | 100 | 100 | 100 |
| Cyperus rotundus | 100 | 100 | 100 | 100 | 100 | 100 |
| Echinochloa crus-galli | 100 | 100 | 100 | 100 | 100 | 100 |

| Active ingredient | III+V | | | IV+V | | |
|---|---|---|---|---|---|---|
| kg/ha | 2+1 | 1+2 | 1.5+1.5 | 2+1 | 1+2 | 1.5+1.5 |
| Oryza sativa | 0 | 10 | 5 | 0 | 10 | 5 |
| Alisma plantago-aquatica | 100 | 100 | 100 | 100 | 100 | 100 |
| Cyperus esculentus | 100 | 100 | 100 | 100 | 100 | 100 |
| Cyperus rotundus | 100 | 100 | 100 | 100 | 100 | 100 |
| Echinochloa crus-galli | 100 | 100 | 100 | 100 | 100 | 100 |

0 = no damage
100 = complete destruction

We claim:
1. A herbicide composition comprising a herbicidally effective amount of a mixture of herbicides consisting essentially of a. a compound of the formula

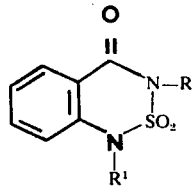

where R denotes lower alkyl of a maximum of 4 carbon atoms and $R^1$ denotes hydrogen, or a salt thereof, and b. S—(2-methyl-1-piperidylcarbonylmethyl)—O,O—di-n-propyldithiophosphate in a weight ratio of a to b of 5:1 to 1:5.

2. A herbicide composition as claimed in claim 1 wherein compound a is 3-isopropyl-2,1,3-benzothiadiazinone-(4)-2,2-dioxide or an ammonium, sodium, potassium, lithium, calcium, magnesium, ethylamine, dimethylamine, ethanolamine, diethanolamine or dimethylethanolamine salt thereof.

* * * * *